United States Patent [19]

Hilbert

[11] Patent Number: 5,068,766

[45] Date of Patent: Nov. 26, 1991

[54] SOLID ELECTROLYTE CAPACITOR IN A CHIP STRUCTURE

[75] Inventor: Ferdinand Hilbert, Heidenheim-Schnaith, Fed. Rep. of Germany

[73] Assignee: Siemens Aktiengesellschaft, Munich, Fed. Rep. of Germany

[21] Appl. No.: 572,258

[22] Filed: Aug. 27, 1990

[30] Foreign Application Priority Data

Sep. 19, 1989 [DE] Fed. Rep. of Germany ....... 3931265

[51] Int. Cl.⁵ .............................................. H01G 9/00
[52] U.S. Cl. .................................................. 361/534
[58] Field of Search ................ 361/534, 535, 536, 540

[56] References Cited

U.S. PATENT DOCUMENTS 4,935,848  6/1990  Yamane et al. .................... 361/534

Primary Examiner—Donald A. Griffin

[57] ABSTRACT

In a solid electrolyte capacitor in a chip structure, a capacitor member is connected to a cathode terminal by a solder layer or by a conductive glue. A fuse element is arranged in the cathode terminal, the fuse element bridging an opening in the cathode terminal. The cathode terminal is interrupted at the location of the opening to place the fuse element in series with the cathode terminal and the body of the capacitor. An anode wire is connected to the anode terminal.

4 Claims, 1 Drawing Sheet

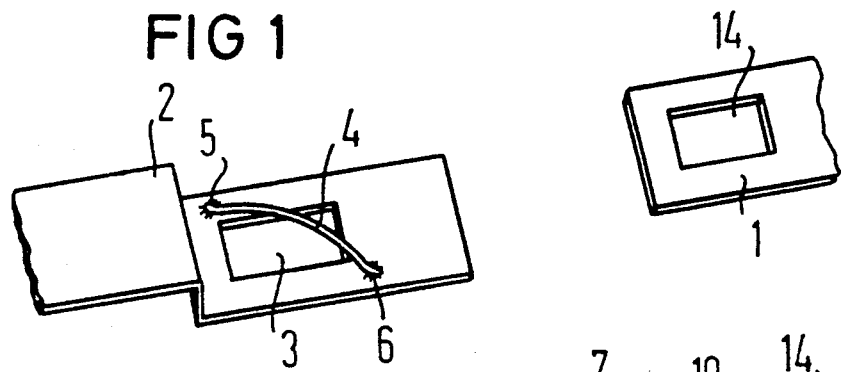
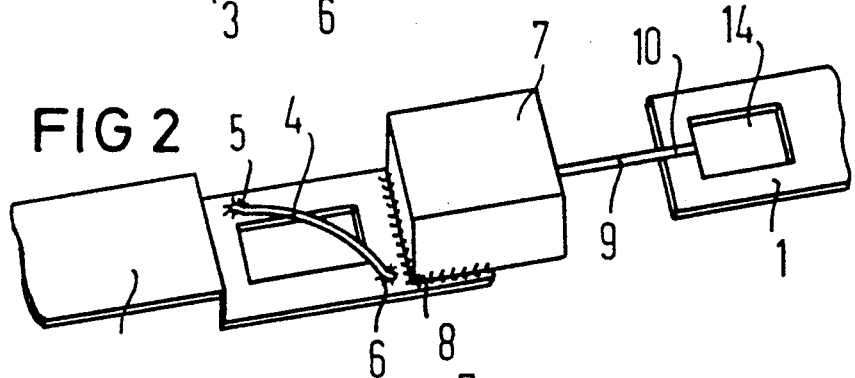
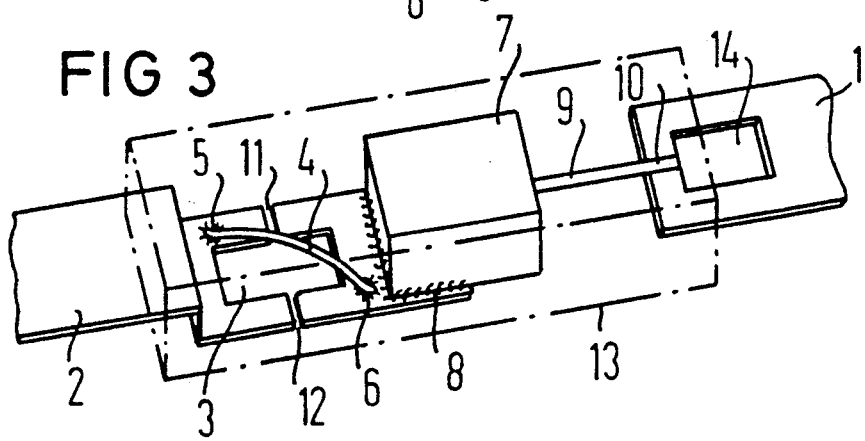
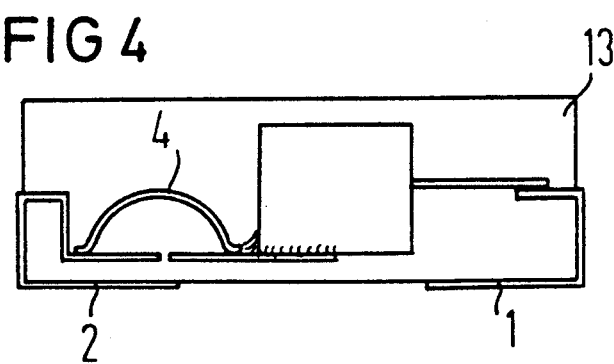

SOLID ELECTROLYTE CAPACITOR IN A CHIP STRUCTURE

CROSS REFERENCE TO RELATED APPLICATIONS

This application is related to an application Ser. No. 574,797, filed Aug. 30, 1990, an application Ser. No. 574,798, filed Aug. 30, 1990, and an application Ser. No. 574,796, filed Aug. 30, 1990.

BACKGROUND OF THE INVENTION

1. Field of the Invention

The present invention relates to a solid electrolyte capacitor in a chip structure having a sintered anode member composed of a valve metal (electrochemical vent or valve metal), an oxide layer acting as a dielectric arranged thereon, a semiconductor solid electrode acting as a cathode, a cathode contact, a cathode terminal and an anode terminal, an envelope and a fuse element.

2. Description of the Prior Art

Given operation at low-impedance voltage sources, such solid electrolytic capacitors have no current limitation in case of a voltage puncture, for example, given reversed connection. The short-circuit current that can be extremely high under certain circumstances can heat the capacitor body to such a high temperature that the sintered member used as the anode begins to glow. Given capacitors that have a plastic envelope, the envelope can be caused to burn. When such capacitors are arranged on printed circuitboards, this can have disadvantageous consequences for the neighboring components, since they can likewise be destroyed due to the great heating. There is also the risk that the overall printed circuitboard will start to burn and, therefore, the equipment will be destroyed.

The German patent application 25 31 438 C3 discloses a solid electrolyte capacitor that is equipped with a safety fuse that is arranged in the cathode lead. This thereby involves relatively large structures, so that this embodiment cannot be employed in the extremely-small space available in solid electrolyte capacitors in a chip structure.

SUMMARY OF THE INVENTION

It is therefore an object of the present invention to provide a solid electrolyte capacitor in a chip structure having a fuse element that is sure to disconnect given a voltage puncture with subsequent thermal overload (self-heating) and whereby the induction of the fuse element into the capacitor housing can be automated and the capacitor can thus be economically manufactured.

This object is achieved, according to the present invention, in that the fuse element is integrated within the envelope in the cathode terminal or in the anode terminal.

According to the feature of the invention, the solid electrolyte capacitor is particularly characterized in that the fuse element bridges a recess arranged in the electrode terminal, the recess being parted from the remaining electrode terminal by parting locations.

According to another feature of the invention, a solid electrolyte capacitor of the type set forth above is particularly characterized in that the fuse element is composed of a resistance wire (current fuse).

A further feature of the invention is provided in a solid electrolyte capacitor of the type set forth above which is particularly characterized in that the fuse element is composed of a solder metal (safety fuse).

According to another feature of the invention, a solid electrolyte capacitor of the type just mentioned is particularly characterized in that a fuse element is arranged in the cathode terminal.

BRIEF DESCRIPTION OF THE DRAWING

Other objects, features and advantages of the invention, its organization, construction and operation will be best understood from the following detailed description, taken in conjunction with the accompanying drawing, on which:

FIG. 1 is a perspective view of a portion of the system carrier with a fuse element;

FIG. 2 is a perspective view of a sintered member mounted in the system carrier;

FIG. 3 is a perspective view of an enveloped capacitor mounted in the system carrier; and FIG. 4 is a side view of a capacitor with bent-over terminals.

DESCRIPTION OF THE PREFERRED EMBODIMENTS

FIG. 1 illustrates portions of a continuous system carrier that has an anode terminal 1 with a punched-out opening 14 therein and has a cathode terminal 2 with a punched-out opening 3 therein. A fuse element 4, for example a solder wire, is stretched over the opening 3 in a loop, the fuse element 4 being connected to the cathode terminal 2 by soldering, welding or bonding at the spots 5 and 6.

FIG. 2 illustrates a carrier system in which the sintered anode member 7 is integrated via solder locations 8 or a conductive glue with the cathode terminal 2. An anode wire 9 is welded to the anode terminal 1 and 10. The sintered member 7 is composed of a valve metal, preferably tantalum, and the anode wire 9 is sintered into the anode member 7 and is composed of the same valve member (tantalum) as the anode member 7. Semiconducting manganese dioxide, for example, is employed as a solid electrolyte. A cathode contact, for example, a conductive layer of silver lacquer that is connected to the solder or to the glue 8 in an electrically-conductive manner, serves the purpose of contacting the solid electrolyte serving as the cathode.

FIG. 3 illustrates how the cathode terminal 2 is parted at parting locations 11 and 12 by punching or with a laser beam and how a plastic envelope 13 is applied. The fuse is functional after the application of the parting locations 11 and 12.

FIG. 4 illustrates a capacitor with terminals 1 and 2 that are bent over onto the plastic envelope 13 and form a seating surface of the capacitor.

When the fuse element 4 is composed of a solder metal as a safety fuse, the cathode terminal 2 is preferably selected as the fuse carrier.

When a current fuse (resistance wire) is utilized, either the cathode terminal 2 or the anode terminal 1 can be used as a fuse carrier, whereby, for example, the punched-out portion 14 can be bridged at the anode terminal 1.

The advantages exist in both instances that the fuse element can be soldered, welded or bonded onto the terminal with an automatic unit, that the fuse element attached in such a manner does not tend to be damaged during further processing, that the contacting of the terminals to the anode member can be carried out in the same manner as given a capacitor without a fuse, and that, therefore, the capacitor with a fuse can be economically manufactured.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A solid electrolyte capacitor comprising:
a capacitor body including a sintered anode member comprising a valve metal, an
oxide layer on said anode member serving as a dielectric, a cathode on said oxide layer comprising a semiconducting solid electrolyte, and a cathode contact on said cathode;
an anode terminal;
an anode wire connecting said sintered anode member to said anode terminal;
a cathode terminal connected to said cathode contact;
a fuse integrated in series in a selected terminal of said cathode and anode terminals; and
a plastic envelope covering said capacitor body and said fuse with said anode and cathode terminals extending through said envelope,
said selected terminal including an opening therein in a portion thereof within said envelope;
said fuse bridging and connected to said selected terminal on opposite sides of said opening, and
cuts through said selected terminal at said opening to separate said selected terminal and place said fuse in a series connection therewith.

2. The solid electrolyte capacitor of claim 1, wherein: said fuse comprises a resistance wire.

3. The solid electrolyte capacitor of claim 1, wherein: said fuse comprises a solder metal.

4. The solid electrolyte capacitor of claim 1, wherein: said terminal is the cathode terminal.

* * * * *